(12) United States Patent
Zanetti et al.

(10) Patent No.: US 8,682,595 B2
(45) Date of Patent: Mar. 25, 2014

(54) METHOD TO ESTIMATE $NO_2$ CONCENTRATION IN AN EXHAUST GAS OF AN INTERNAL COMBUSTION ENGINE

(75) Inventors: Igor Zanetti, Verrayes (IT); Marco Petronzi, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 341 days.

(21) Appl. No.: 13/090,604

(22) Filed: Apr. 20, 2011

(65) Prior Publication Data

US 2011/0257899 A1 Oct. 20, 2011

(30) Foreign Application Priority Data

Apr. 20, 2010 (GB) .................................... 1006574.6

(51) Int. Cl.
*G06F 19/00* (2011.01)
(52) U.S. Cl.
USPC .......................................................... 702/24
(58) Field of Classification Search
USPC .......................................................... 702/24
See application file for complete search history.

(56) References Cited

U.S. PATENT DOCUMENTS

2009/0288396 A1 11/2009 Sakata et al.

FOREIGN PATENT DOCUMENTS

JP 2007255345 A 10/2007
WO 2010061672 A1 6/2010

OTHER PUBLICATIONS

Arjun Krishnan, Prediction of NOx reduction with Exhaust Gas Recirculation using the Flame Temperature Correlation Technique, Proceedings of the National Conference on Advances in Mechanical Engineering Mar. 18-19, 2006, Kota, India Engineering College Kota, Kota (Rajasthan) India ECKAME-2006-T-23, p. 378-385.*
British Patent Office, British Search Report for British Application No. 1006574.6, dated Jul. 19, 2010.

* cited by examiner

*Primary Examiner* — Tung S Lau
(74) *Attorney, Agent, or Firm* — Ingrassia Fisher & Lorenz, P.C.

(57) ABSTRACT

A method is provided to estimate $NO_2$ concentration in exhaust gas flowing through an exhaust pipe of an internal combustion engine. The exhaust pipe has a first section and a second section, and is equipped with an aftertreatment device located between the first section and the second section, and the method includes, but is not limited to determining a parameter related to a $NO_2$ concentration of exhaust gas flowing in the first section, determining an oxidization index expressive of a rate of NO contained in the exhaust gas which oxidizes into $NO_2$ inside the aftertreatment device, and a reduction index expressive of a rate of $NO_2$ contained in the exhaust gas which is reduced into NO inside the aftertreatment device, and calculating a parameter related to a $NO_2$ concentration in the second section as a function of the parameter related to a $NO_2$ concentration in the first section and of the oxidization index and of the reduction index of the aftertreatment device.

20 Claims, 2 Drawing Sheets

METHOD TO ESTIMATE NO₂ CONCENTRATION IN AN EXHAUST GAS OF AN INTERNAL COMBUSTION ENGINE

CROSS-REFERENCE TO RELATED APPLICATION

This application claims priority to British Patent Application No. 1006574.6, filed Apr. 20, 2010, which is incorporated herein by reference in its entirety.

TECHNICAL FIELD

The technical field relates to a method for estimating $NO_2$ concentration in the exhaust gas flowing through an aftertreatment system of an internal combustion engine of a motor vehicle, typically a Diesel engine.

BACKGROUND

A Diesel engine is conventionally equipped with an aftertreatment system that comprises an exhaust pipe, for leading the exhaust gas from the engine to the environment, and a plurality of aftertreatment devices located in the exhaust pipe, for degrading and/or removing pollutants from the exhaust gas before discharging it in the environment. In greater detail, a conventional aftertreatment system generally comprises a Diesel Oxidation Catalyst (DOC), for oxidizing hydrocarbon (HC) and carbon monoxides (CO) into carbon dioxide ($CO_2$) and water ($H_2O$), and a Diesel Particulate Filter (DPF), located in the exhaust pipe downstream the DOC, for removing diesel particulate matter or soot from the exhaust gas. In order to reduce NOx emissions, most aftertreatment systems further comprise a Selective Reduction Catalyst (SCR), which is located in the exhaust pipe downstream the DPF.

The SCR is a catalytic device in which the nitrogen oxides (NOx) contained in the exhaust gas are reduced into diatonic nitrogen ($N_2$) and water ($H_2O$), with the aid of a gaseous reducing agent, typically ammonia ($NH_3$), that is absorbed inside the catalyst. The ammonia is obtained through thermohydrolysis of a Diesel Exhaust Fluid (DEF), typically urea ($CH_4N_2O$), that is injected into the exhaust pipe through a dedicated injector located between the DPF and the SCR.

These aftertreatment systems are generally controlled by an engine control unit (ECU), with the aid of an Universal Exhaust Gas Oxygen (UEGO) sensor, located in the exhaust pipe upstream the DOC, and at least a NOx sensor, located in the exhaust pipe downstream the DPF and upstream the DEF injector. The UEGO sensor is provided for the ECU to measure the oxygen ($O_2$) concentration in the exhaust gas, in order to determine the air to fuel ratio λ within the engine cylinders.

The NOx sensor is provided for the ECU to measure the NOx concentration in the exhaust gas, in order to calculate the quantity of DEF to be injected in the exhaust pipe for achieving an adequate NOx reduction inside the SCR. However, while the conventional NOx sensors provide a measure of the concentration of NOx as a whole, namely without distinction between NO and $NO_2$, the reduction reactions occurring in the SCR depend on the individual concentrations of $NO_2$ and NO, so that the calculation of the DEF quantity can sometime result unreliable.

In greater detail, the NOx reduction reactions in the SCR can happen according to the following chemical equations:

  (1)

  (2)

  (3)

Where the reaction (1) prevails when the $NO_2$ concentration is lower than NO concentration, the reaction (2) prevails when the $NO_2$ concentration is quite similar to the NO concentration, and the reaction (3) prevails when the $NO_2$ concentration is greater than NO concentration.

Notwithstanding the above mentioned reactions involve different DEF consumptions, since the NOx sensors are not able to discriminate $NO_2$ from NO, the calculation of the DEF quantity is currently based on average ANR (Ammonia to NOx Ratio) in the chemical reactions, thereby returning a rough estimation that can lead to an excessive DEF consumption or to a reduced SCR reduction efficiency, depending on exhaust gas conditions. Moreover, the conventional NOx sensors are generally affected by an high $NO_2$ cross sensitivity, which can deviate the measured NOx concentration from the real one. $NO_2$ cross sensitivity is an expression used to indicate that the response signal generated by a conventional NOx sensor is influenced also by the $NO_2$ concentration alone, so that different response signals can be generated by the NOx sensor, even if the actual NOx concentration in the exhaust gas is the same.

In view of the above, it is at leats one object to provide a method for estimating the $NO_2$ concentration in the exhaust gas flowing through an aftertreatment system, so as for example to compensate the NOx sensor readings and/or to perform a more accurate estimation of the DEF quantity to be injected into the exhaust pipe, in order to achieve a reduced DEF consumption and an improved SCR reduction efficiency. At least another object is to reach the above mentioned goal with a simple, rational and rather inexpensive solution. Furthermore, other objects, desirable features and characteristics will become apparent from the subsequent summary and detailed description, and the appended claims, taken in conjunction with the accompanying drawings and this background.

SUMMARY

An embodiment provides a method to estimate $NO_2$ concentration in exhaust gas flowing through an exhaust pipe of an internal combustion engine. The exhaust pipe has a first section and a second section, and is equipped with at least an aftertreatment device located between the first and the second section, and wherein the method comprises the steps of: determining a parameter related to a $NO_2$ concentration of exhaust gas flowing in the first section, determining, for each aftertreatment device located between the first and the second section, an oxidization index expressive of a rate of NO contained in the exhaust gas which oxidizes into $NO_2$ inside the aftertreatment device, and a reduction index expressive of a rate of $NO_2$ contained in the exhaust gas which is reduced into NO inside the aftertreatment device, and calculating a parameter related to a $NO_2$ concentration in the second section as a function of the parameter related to a $NO_2$ concentration in the first section, of the oxidization index and of the reduction index of each aftertreatment device located between the first and the second section.

This strategy is based on the assumption that, while passing trough any aftertreatment device, a part of the NO contained in the exhaust gas can be converted into $NO_2$ by oxidization reactions, and in turn a part of the $NO_2$ contained in the exhaust gas can be converted into NO by reduction reactions, thereby changing the $NO_2$ concentration in the exhaust gas across the aftertreatment device. Starting from this assumption, the strategy provides for creating a lumped element model of the aftertreatment system, wherein each aftertreatment device of the system is modeled as a discrete entity having a determined impact on the $NO_2$ concentration, which is represented by the oxidization and reduction index, so as to allow the estimation of the $NO_2$ concentration at any point of the aftertreatment system, starting from the determination of the $NO_2$ concentration at a single point. Therefore, assuming that the oxidization and reduction indexes are properly calibrated, this strategy provides a simple and reliable way for estimating $NO_2$ concentration, which can be useful for compensating the NOx sensor readings and/or for performing a more accurate estimation of the DEF quantity to be injected into the exhaust pipe, in order to achieve a reduced DEF consumption and an improved SCR reduction efficiency.

According to an embodiment, the $NO_2$ related parameter is the ratio of $NO_2$ to NOx in the exhaust gas. This embodiment has the advantage of providing an immediate indication of the $NO_2$ concentration.

According to an embodiment, the parameter related to a $NO_2$ concentration of the exhaust gas flowing in the first section is determined at an inlet of the exhaust pipe. At the inlet of the exhaust pipe, the a $NO_2$ concentration of the exhaust gas generally corresponds to that of the exhaust gas exiting from the internal combustion engine, so that this embodiment provide a reliable way to determine the $NO_2$ concentration in a first section of the exhaust pipe.

According to an embodiment, the parameter related to a $NO_2$ concentration of the exhaust gas flowing in the first section is determined on the base of one or more physical parameters of the exhaust gas, such as for example exhaust gas temperature and oxygen ($O_2$) concentration in the exhaust gas, which are correlated to the $NO_2$ concentration. This embodiment has the advantage to provide a reliable determination of the $NO_2$ concentration, because a rather strict relationship exists between the above mentioned exhaust gas physical parameters and $NO_2$ concentration. Moreover, the above mentioned exhaust gas physical parameters are generally already measured at the inlet of the exhaust pipe for other engine managing purpose, so that the determination of the $NO_2$ concentration at that point of the exhaust pipe results quite simple and inexpensive.

According to another embodiment, the parameter related to a $NO_2$ concentration of the exhaust gas flowing in the first section is determined through an empirically determined map correlating the parameter related to a $NO_2$ concentration of the exhaust gas to said one or more exhaust gas physical parameters. In this way, the above mentioned map can be determined through an experimental activity and then stored in a data carrier, thereby simplifying the determination of the $NO_2$ concentration related parameter at the inlet of the exhaust pipe.

According to an embodiment, the aftertreatment device, located between the first and the second section of the exhaust pipe, oxidizes hydrocarbon and carbon monoxides of the exhaust gas into carbon dioxide and water. As a matter of fact, this aftertreatment device can be a conventional DOC, so that the present embodiment of the invention has the advantage of allowing the estimation of a variation of the $NO_2$ concentration across a DOC.

According to an embodiment, the oxidization index and the reduction index of this aftertreatment device are individually determined on the base of one or more operating parameters of the aftertreatment device itself, such as for example exhaust gas mass flow across the aftertreatment device, exhaust gas temperature at the aftertreatment device inlet, temperature of the aftertreatment device substrate and hydrocarbon concentration in the exhaust gas at the aftertreatment device inlet, which influences the rate of NO contained in the exhaust gas that oxidizes into $NO_2$ inside the aftertreatment device, and the rate of $NO_2$ contained in the exhaust gas that is reduced into NO inside the aftertreatment device. Since this operating parameters have a rather strict relationship with the NO oxidization rate and the $NO_2$ reduction rate occurring inside the DOC, the above mentioned aspect of this embodiment has the advantage to provide a reliable determination of the DOC oxidization and reduction indexes.

According to another embodiment, the oxidization index of the aftertreatment device is determined through an empirically determined map correlating the oxidization index to said one or more DOC operating parameters of the aftertreatment device, and likewise the reduction index of the aftertreatment device is determined through an empirically determined map correlating the reduction index to said one or more operating parameters of the aftertreatment device. This embodiment has the advantage that the above mentioned maps can be determined through an experimental activity and then stored in a data carrier, thereby simplifying the determination of the oxidization and reduction indexes.

According to still another embodiment, the aftertreatment device, located between the first and the second section of the exhaust pipe, removes particulate matter from the exhaust gas. As a matter of fact, this aftertreatment device can be a conventional DPF, so that the embodiment has the advantage of allowing the estimation of a variation of the $NO_2$ concentration across a DPF.

According to an embodiment, the oxidization index and the reduction index of this aftertreatment device are individually determined on the base of a soot loading level inside the aftertreatment device and of one or more operating parameters of the aftertreatment device itself, such as for example exhaust gas mass flow across the aftertreatment device, exhaust gas temperature at the aftertreatment device inlet and temperature of the aftertreatment device substrate, which influences the rate of NO contained in the exhaust gas that oxidizes into $NO_2$ inside the aftertreatment device, and the rate of $NO_2$ contained in the exhaust gas that is reduced into NO inside the aftertreatment device. As a matter of fact, it has been found that the NO oxidization rate and $NO_2$ reduction rate inside a DPF are influenced not only by the DPF operating parameters, but also by the actual soot content inside the DPF.

The effect of the soot content is that of promoting a continuous regeneration of the DPF, which is conventionally referred as CRT (Continuously Regenerating Trap) effect.cTaking into account the soot loading level as well as the DPF operating parameters, the above mentioned aspect of the invention has the advantage of providing a reliable determination of the DPF oxidization and reduction indexes.

According to another embodiment, the oxidization index and the reduction index of the aftertreatment device are individually determined as a function of at least a respective couple of contributing factors, whereby each couple of factors includes a first factor determined through an empirically determined map correlating said first factor to at least the soot loading level, and a second factor determined through an empirically determined map correlating the second factor to said one or more operating parameters of the aftertreatment device.

This embodiment has the advantage that the above mentioned maps can be determined through an experimental activity and then stored in a data carrier, thereby simplifying the determination of the oxidization and reduction indexes. Moreover, since the effect of the soot loading level is considered separately from the effect of the other operating parameters, the above mentioned experimental activity results more simple, quick and cheap.

The method according to any embodiment can be carried out with the help of a computer program comprising a program-code for carrying out all the steps of the method described above, and in the form of a computer program product comprising the computer program.

The computer program product can be embodied as an internal combustion engine equipped with an exhaust pipe having a first section and a second section, and at least an aftertreatment device located in the exhaust pipe between the first and the second section, wherein the internal combustion engine is further equipped with an ECU, a data carrier associated to the ECU, and the computer program stored in the data carrier, so that, when the ECU executes the computer program, all the steps of the method described above are carried out.

The method can be embodied as an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
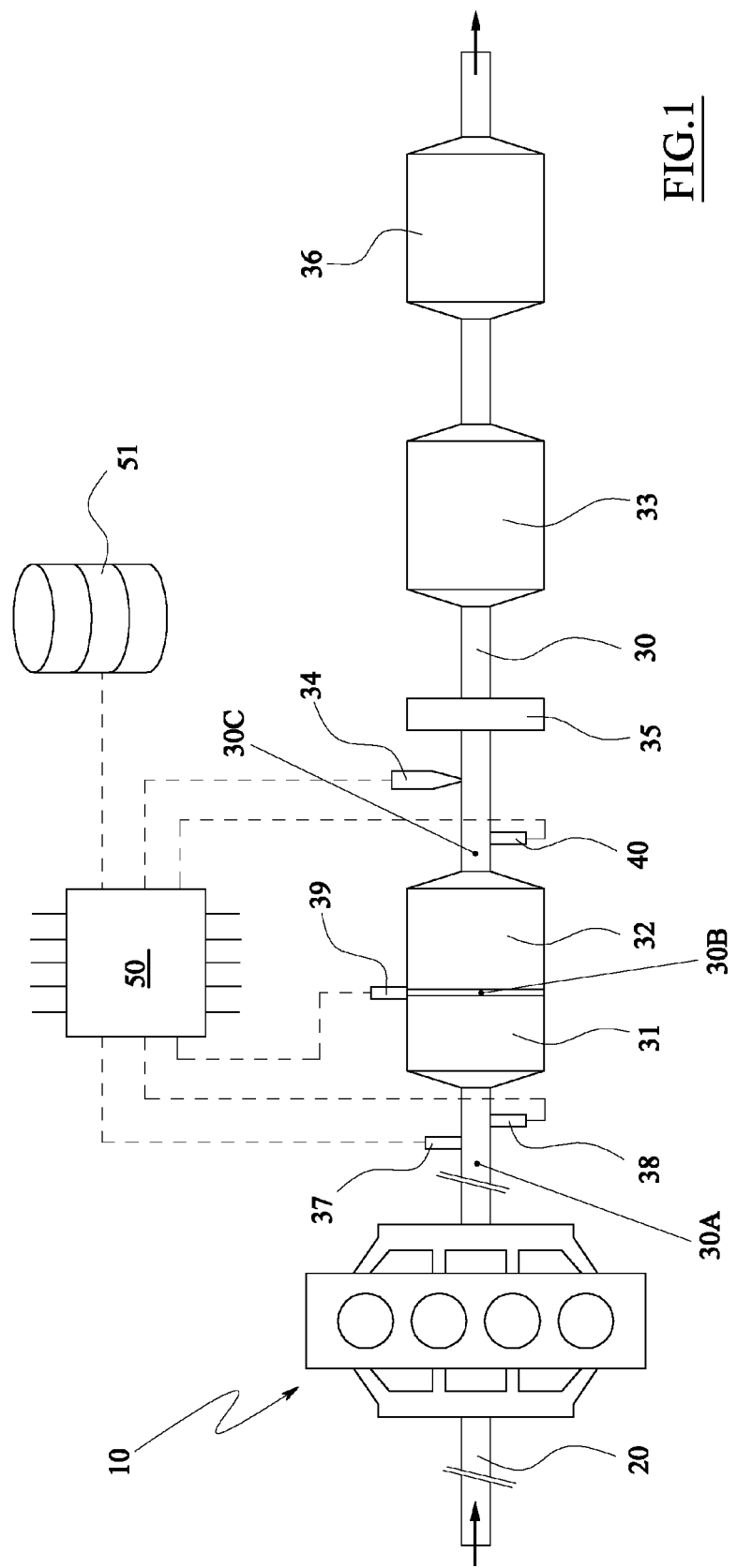
FIG. 1 is a schematic representation of a Diesel engine equipped with an aftertreatment system.

The following detailed description is merely exemplary in nature and is not intended to limit application and uses. Furthermore, there is no intention to be bound by any theory presented in the preceding background or summary or the following detailed description.

An embodiment is hereinafter disclosed with reference to a Diesel engine 10 of a motor vehicle. The Diesel engine 10 is conventionally equipped with an intake pipe 20 for feeding fresh air into the engine cylinders, an with an exhaust pipe 30 for discharging exhaust gas from the engine cylinders into the environment. A plurality of aftertreatment devices, indicated with the references from 31 to 33, are located in the exhaust pipe 30, so as to globally define an aftertreatment system suitable for degrading and/or removing pollutants from the exhaust gas, before discharging it in the environment.

In the present embodiment, the aftertreatment system comprises a Diesel Oxidation Catalyst (DOC) 31, for oxidizing hydrocarbon (HC) and carbon monoxides (CO) into carbon dioxide ($CO_2$) and water ($H_2O$); a Diesel Particulate Filter (DPF) 32, which is located downstream the DOC 31, for removing diesel particulate matter or soot from the exhaust gas; and furthermore a Selective Reduction Catalyst (SCR) 33, located downstream the DPF 32, for reducing the nitrogen oxides (NOx) contained in the exhaust gas into diatonic nitrogen ($N_2$) and water ($H_2O$). The DOC 31 and the DPF 32 are close coupled and contained in a single casing.

The SCR 33 is associated with a DEF injector 34, which is located in the exhaust pipe 30 between the DPF 32 and the SCR 33, for injecting a Diesel Exhaust Fluid (DEF), typically urea ($CH_4N_2O$), in the exhaust gas stream. Due to thermo-hydrolysis reactions occurring inside the exhaust pipe 30, the DEF is converted into a gaseous reducing agent, typically ammonia ($NH_3$), which is absorbed inside the SCR 33, so as to promote the NOx reduction reactions.

A mixer 35 is located in the exhaust pipe 30 between the DEF injector 34 and the SCR 33, in order to improve the mixing of the DEF in the exhaust gas, while a conventional muffler 36 is located downstream the SCR 33. The aftertreatment system is further provided with several sensors, including a Universal Exhaust Gas Oxygen (UEGO) sensor 37 for measuring the oxygen ($O_2$) concentration in the exhaust gas at the DOC inlet; a first temperature sensor 38 for measuring the exhaust gas temperature at the DOC inlet; a second temperature sensor 39 for measuring the exhaust gas temperature at the DPF inlet; and a NOx sensor 40 for measuring the NOx concentration in the exhaust gas downstream the DPF 32 and upstream the DEF injector 34.

These sensors 37-40 are connected to an Engine Control Unit 50 that is generally provided for controlling the operation of the aftertreatment system. By way of example, the ECU 50 is provided for reading the NOx concentration in the exhaust gas through the sensor 40, for applying said reading to a known routine that calculates the quantity of DEF to be injected in the exhaust pipe 30, and for commanding the DEF injector 34 accordingly.

Figure 2:
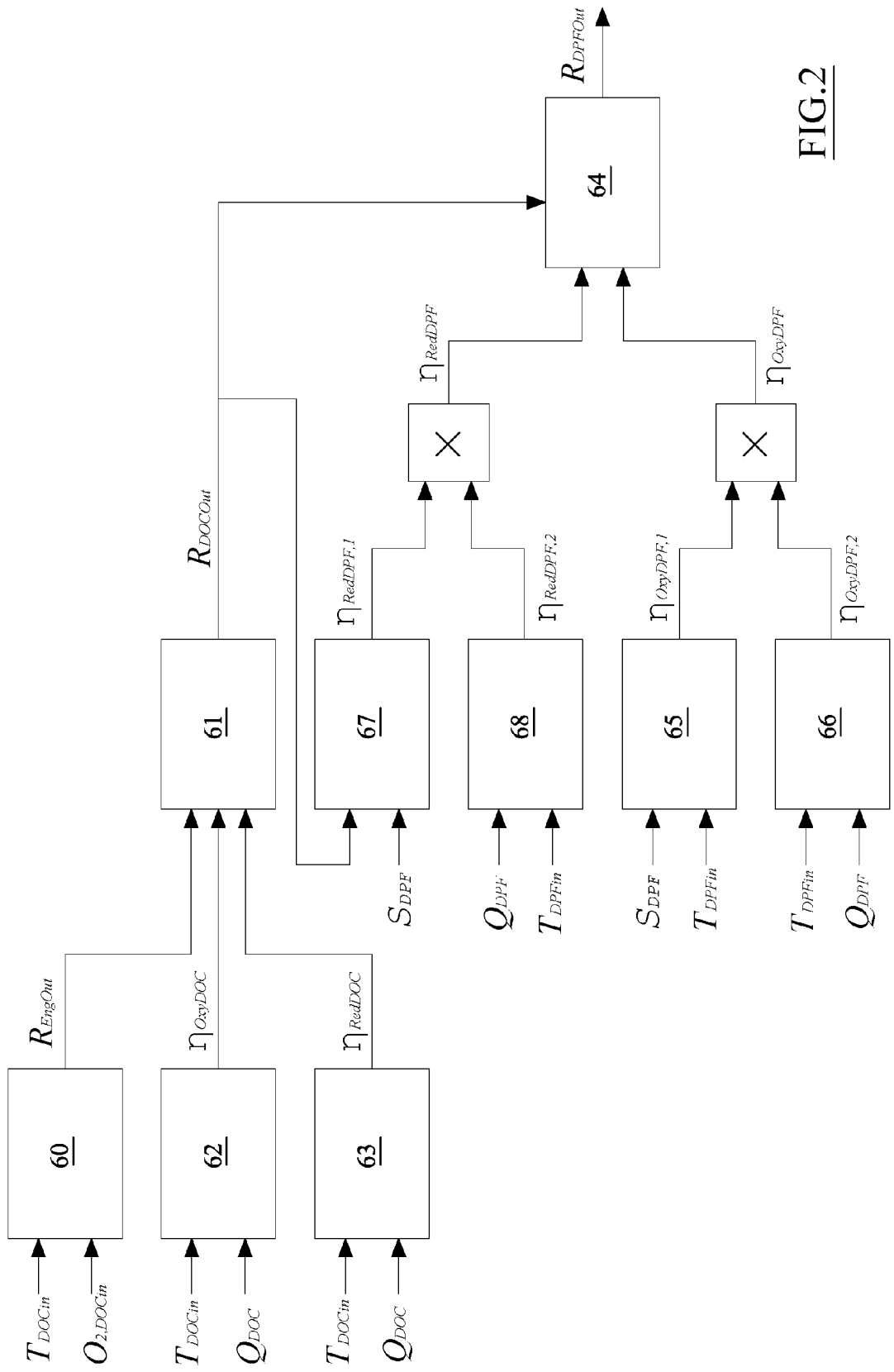
FIG. 2 is a flowchart representing a method according to an embodiment.

An embodiment provides a method for estimating the ratio of $NO_2$ to NOx in the exhaust gas flowing in different sections of the exhaust pipe 30. For the sake of simplicity, the $NO_2$ to NOx ratio is hereinafter indicated as R. As shown in FIG. 2, the method firstly provides for determining the ratio REngOut in the exhaust gas flowing at an inlet 30A of the exhaust pipe 30, namely downstream the Diesel engine 10 and upstream the DOC 31:

$$R_{EngOut} = \left(\frac{NO_2}{NO_x}\right)_{EngOut}.$$

The ratio REngOut is determined through an empirically determined map 60 correlating the ratio REngOut to the exhaust gas temperature TDOCin at the DOC inlet and the oxygen concentration $O_2$,DOCin in the exhaust gas at the DOC inlet. The exhaust gas temperature TDOCin and the oxygen concentration $O_2$, DOCin can be respectively measured by means of the temperature sensor 38 and the UEGO sensor 37.

Having determined the ratio REngOut, the method provides for calculating the ratio RDOCOut in the exhaust gas flowing in a section 30B of the exhaust pipe 30, between the DOC 31 and the DPF 32.

The ratio RDOCOut is determined through a routine 61 according to the following equation:

$$R_{DOCOut} = \left(\frac{NO_2}{NO_x}\right)_{DOCOut}$$
$$= [R_{EngOut} + (1 - R_{EngOut}) \cdot \eta_{OxyDOC}] \cdot (1 - \eta_{RedDoc})$$

Where $\eta OxyDOC$ is an index expressive of the rate of NO contained in the exhaust gas which oxidizes into $NO_2$ inside the DOC 31, and $\eta RedDOC$ is an index expressive of the rate of $NO_2$ contained in the exhaust gas which is reduced into NO inside the DOC 31. The index $\eta OxyDOC$ is determined through an empirically determined map 62 correlating the $\eta OxyDOC$ to the exhaust gas temperature TDOCin at the DOC inlet and the exhaust gas mass flow QDOC across the DOC. Likewise, the index $\eta RedDOC$ is determined through another empirically determined map 63 correlating the $\eta RedDOC$ to the exhaust gas temperature TDOCin at the DOC inlet and the exhaust gas mass flow QDOC across the DOC. While the exhaust gas temperature TDOC in can be measured by means of the temperature sensor 38, the exhaust gas mass flow QDOC can be calculated as a function of one or more engine operating parameters, such as for example engine speed and engine load.

Having determined the ratio RDOCOut, the method provides for calculating the ratio RDPFOut in the exhaust gas flowing in a section 30C of the exhaust pipe 30, between the DPF 32 and the SCR 33. The ratio RDPFOut is determined through a routine 64 according to the following equation:

$$R_{DPFOut} = \left(\frac{NO_2}{NO_x}\right)_{DPFOut}$$
$$= [R_{DOCOut} + (1 - R_{DOCOut}) \cdot \eta_{OxyDPF}] \cdot (1 - \eta_{RedDPF})$$

Where $\eta OxyDPF$ is an index expressive of the rate of NO contained in the exhaust gas that oxidizes into $NO_2$ inside the DPF 32, and $\eta RedDPF$ is an index expressive of the rate of $NO_2$ contained in the exhaust gas which is reduced into NO inside the DPF 32.

The index $\eta OxyDPF$ is calculated according to the following equation:

$$\eta_{OxyDPF} = \eta_{OxyDPF,1} \cdot \eta_{OxyDPF,2}$$

Where $\eta OxyDPF,1$ is a contributing factor that takes into account the CRT effect due to the actual soot loading level inside the DPF 32, while $\eta OxyDPF,2$ is a contributing factor that take into accounts a plurality of DPF operating parameters, but not the soot content inside the DPF. In greater detail, the first factor $\eta OxyDPF,1$ is determined through an empirically determined map 65 correlating the factor $\eta OxyDPF,1$ to the quantity of soot SDPF actually contained in the DPF 32 and to the exhaust has temperature TDPFin at the DPF inlet. The second factor $\eta OxyDPF,2$ is determined through an empirically determined map 66 correlating the factor $\eta OxyDPF,2$ to the exhaust has temperature TDPFin at the DPF inlet and to the exhaust gas mass flow QDPF across the DPF 32.

Analogously, the index $\eta RedDPF$ is calculated according to the following equation:

$$\eta_{RedDPF} = \eta_{RedDPF,1} \cdot \eta_{RedDPF,2}$$

Where $\eta RedDPF,1$ is a contributing factor that takes into account the CRT effect due to the actual soot loading level inside the DPF 32, while $\eta RedDPF,2$ is a contributing factor that take into accounts a plurality of DPF operating parameters, but not the soot content inside the DPF. Since it has been found that the impact of the CRT effect on the $NO_2$ reduction rate inside the DPF 32 is strongly influenced by the $NO_2$ concentration at the DPF inlet, the first factor $\eta RedDPF,1$ is determined through an empirically determined map 67 correlating the factor $\eta RedDPF,1$ to the quantity of soot SDPF actually contained in the DPF 32 and to the previously determined ratio RDOCOut. The second factor $\eta RedDPF,2$ is determined through an empirically determined map 68 correlating the factor $\eta RedDPF,2$ to the exhaust has temperature TDPFin at the DPF inlet and to the exhaust gas mass flow QDPF across the DPF 32.

The exhaust has temperature TDPFin at the DPF inlet can be measured by means of the temperature sensor 39, while the exhaust gas mass flow QDPF across the DPF 32 can be assumed to be equal to the exhaust mass flow QDOC across the DOC 31. The quantity of soot SDPF actually contained in the DPF 32 can be estimated through one of many estimation strategies that are currently known to the skilled man. The estimated ratio RDPFOut is considered to remain constant along the section of the exhaust pipe 30 comprised between the DPF outlet and the SCR inlet. As a consequence, the ratio RDPFOut can be effectively used for managing the SCR 33.

By way of example, since the $NO_2$ reduction reactions occurring in the SCR 33 can follow different chemical equations in response of different $NO_2$ to NO ratio in the exhaust gas, the ratio RDPFOut can be used for performing a more accurate estimation of the DEF quantity to be injected by the DEF injector 34 into the exhaust pipe 30, in order to achieve a reduced DEF consumption and an improved SCR reduction efficiency. The ratio RDPFOut can further be used for correcting the measurements made by the NOx sensor 40, so as to compensate its $NO_2$ cross sensitivity.

According to an embodiment, each embodiment of the estimating method described above can be performed with the help of a computer program comprising a program-code for carrying out all the steps of the method, which is stored in a data carrier 51 associated to the ECU 50. In this way, when the ECU 50 executes the computer program, all the steps of the method described above are carried out.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method to estimate a $NO_2$ concentration in an exhaust gas flowing through an exhaust pipe of an internal combustion engine, the exhaust pipe has a first section and a second section and is equipped with an aftertreatment device located between the first section and the second section, the method comprising:

determining, at an electronic control unit (ECU), a parameter related to a $NO_2$ concentration of exhaust gas flowing in the first section, wherein the parameter related $NO_2$ concentration is a ratio of $NO_2$ to NOx in the exhaust gas;

determining, at the ECU, an oxidization index expressive of a rate of NO contained in the exhaust gas which oxidizes into $NO_2$ inside the aftertreatment device;

determining, at the ECU, a reduction index expressive of a rate of $NO_2$ contained in the exhaust gas which is reduced into NO inside the aftertreatment device; and calculating, at the ECU, a parameter related to the $NO_2$ concentration in the second section as a function of the parameter related to the $NO_2$ concentration in the first section, the oxidization index and the reduction index of the aftertreatment device.

2. The method according to claim 1, wherein the parameter related $NO_2$ concentration is a ratio of $NO_2$ to NOx in the exhaust gas.

3. The method according to claim 1, further comprising determining, at the ECU, the parameter related to the $NO_2$ concentration of the exhaust gas flowing in the first section at an inlet of the exhaust pipe.

4. The method according to claim 1, further comprising determining, at the ECU, the parameter related to the $NO_2$ concentration of the exhaust gas flowing in the first section based at least in part on one or more physical parameters of the exhaust gas correlated to the $NO_2$ concentration.

5. The method according to claim 4, further comprising determining, at the ECU, the parameter related to the $NO_2$ concentration of the exhaust gas flowing in the first section through an empirically determined map correlating the parameter related to the $NO_2$ concentration of the exhaust gas to said one or more physical parameters of the exhaust gas.

6. The method according to claim 1, wherein said aftertreatment device is configured to oxidize hydrocarbon and carbon monoxides of the exhaust gas into carbon dioxide and water.

7. The method according to claim 1, further comprising individually determining, at the ECU, the oxidization index and the reduction index of the aftertreatment device based at least in part on one or more operating parameters of the aftertreatment device, said one or more operating parameters influencing the rate of NO contained in the exhaust gas which oxidizes into $NO_2$ inside the aftertreatment device, and the rate of $NO_2$ contained in the exhaust gas which is reduced into NO inside the aftertreatment device.

8. The method according to claim 7, further comprising:
determining, at the ECU, the oxidization index of the aftertreatment device through an empirically determined map correlating the oxidization index to said one or more operating parameters of the aftertreatment device; and
determining, at the ECU, the reduction index of the aftertreatment device through the empirically determined map correlating the reduction index to said one or more operating parameters of the aftertreatment device.

9. The method according to claim 1, further comprising removing particulate matter from the exhaust gas with said aftertreatment device.

10. The method according to claim 7, further comprising individually determining, at the ECU, the oxidization index and the reduction index of the aftertreatment device based at least in part on a soot loading level inside the aftertreatment device and the one or more operating parameters of the aftertreatment device, said one or more operating parameters influencing the rate of NO contained in the exhaust gas which oxidizes into $NO_2$ inside the aftertreatment device, and the rate of $NO_2$ contained in the exhaust gas which is reduced into NO inside the aftertreatment device.

11. The method according to claim 7, further comprising:
individually determining, at the ECU, the oxidization index and the reduction index of the aftertreatment device as a second function of at least a respective couple of contributing factors; and
determining each of the respective couple of contributing factors, comprising:
determining, at the ECU, a first factor through an empirically determined map correlating said first factor; and
determining, at the ECU, a second factor through the empirically determined map correlating said second factor to said one or more operating parameters of the aftertreatment device.

12. An internal combustion engine, comprising:
an exhaust pipe having a first section and a second section;
an aftertreatment device located in the exhaust pipe between the first section and the second section; and
an ECU configured to
determine a parameter related to a $NO_2$ concentration of exhaust gas flowing in the first section;
determine an oxidization index expressive of a rate of NO contained in an exhaust gas which oxidizes into $NO_2$ inside the aftertreatment device;
determine a reduction index expressive of a rate of $NO_2$ contained in the exhaust gas which is reduced into NO inside the aftertreatment device; and
calculate the parameter related to a $NO_2$ concentration in the second section as a function of the parameter related to the $NO_2$ concentration in the first section, of an oxidization index and of a reduction index of the aftertreatment device.

13. The internal combustion engine according to claim 12, wherein the parameter related to the parameter related to the $NO_2$ concentration is a ratio of $NO_2$ to NOx in the exhaust gas.

14. The internal combustion engine according to claim 12, the ECU further configured to determine the parameter related to the $NO_2$ concentration of the exhaust gas flowing in the first section at an inlet of the exhaust pipe.

15. The internal combustion engine according to claim 14, the ECU further configured to determine the parameter related to the $NO_2$ concentration of the exhaust gas flowing in the first section based at least in part on one or more physical parameters of the exhaust gas correlated to the $NO_2$ concentration.

16. The internal combustion engine according to claim 15, the ECU further configured to determine the parameter related to the $NO_2$ concentration of the exhaust gas flowing in the first section through an empirically determined map correlating the parameter related to the $NO_2$ concentration of the exhaust gas to said one or more physical parameters of the exhaust gas.

17. A non-transitory computer readable medium embodying a computer program product, said computer program product comprising:
a program to estimate a $NO_2$ concentration in an exhaust gas flowing through an exhaust pipe of an internal combustion engine, the exhaust pipe has a first section and a second section and is equipped with an aftertreatment device located between the first section and the second section, the program configured to:
determine a parameter related to a $NO_2$ concentration of exhaust gas flowing in the first section;
determine an oxidization index expressive of a rate of NO contained in the exhaust gas which oxidizes into $NO_2$ inside the aftertreatment device;
determine a reduction index expressive of a rate of $NO_2$ contained in the exhaust gas which is reduced into NO inside the aftertreatment device; and
calculate the parameter related to the $NO_2$ concentration in the second section as a function of the parameter related to the $NO_2$ concentration in the first section, of an oxidization index and of a reduction index of the aftertreatment device.

18. The non-transitory computer readable medium embodying the computer program product claim 17, wherein said aftertreatment device is configured to oxidize hydrocarbon and carbon monoxides of the exhaust gas into carbon dioxide and water.

19. The non-transitory computer readable medium embodying the computer program product claim 18, the program further configured to individually determine the oxidization index and the reduction index of the aftertreatment device based at least in part on one or more operating parameters of the aftertreatment device, said one or more operating parameters influencing the rate of NO contained in the exhaust gas which oxidizes into $NO_2$ inside the aftertreatment device, and the rate of $NO_2$ contained in the exhaust gas which is reduced into NO inside the aftertreatment device.

20. The non-transitory computer readable medium embodying the computer program product claim 19, the further configured to:
  determine the oxidization index of the aftertreatment device through an empirically determined map correlating the oxidization index to said one or more operating parameters of the aftertreatment device; and
  determine the reduction index of the aftertreatment device through the empirically determined map correlating the reduction index to said one or more operating parameters of the aftertreatment device.

* * * * *